United States Patent Office 2,927,879
Patented Mar. 8, 1960

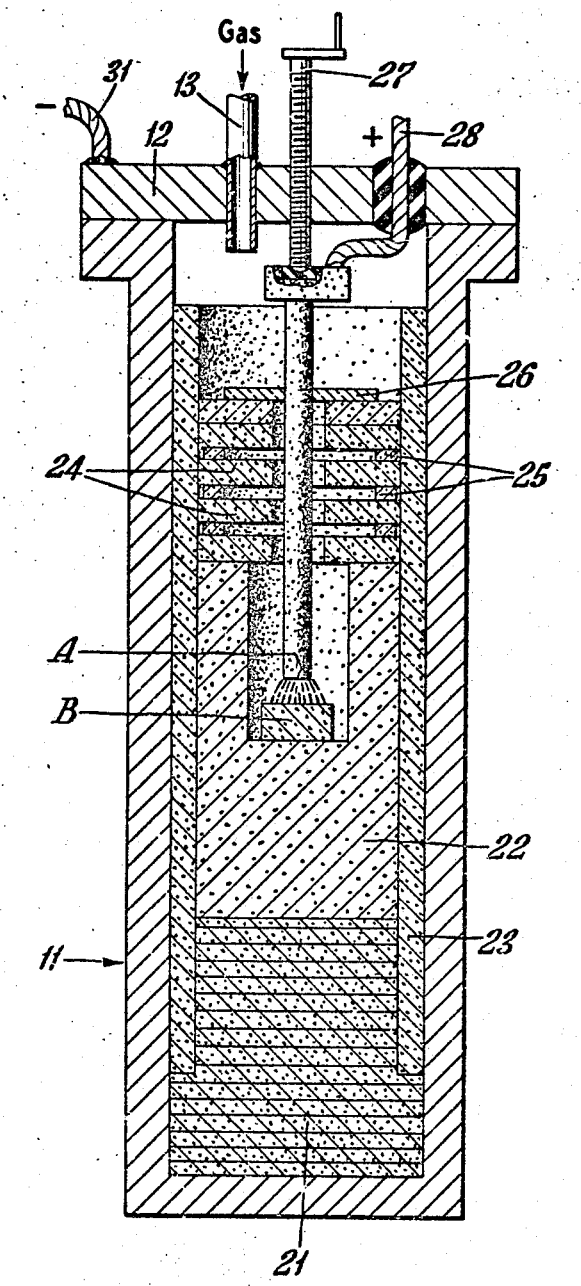

2,927,879

METHOD FOR JOINING CARBON ARTICLES

Matthew T. Jones, Bay Village, Ohio, assignor to Union Carbide Corporation, a corporation of New York Application September 13, 1956, Serial No. 609,679

4 Claims. (Cl. 154—126)

This invention relates to a method for joining carbon articles and the articles so joined. The method is applicable to all of the mechanically stable carbonaceous materials except diamonds.

Carbonaceous articles such as electrodes, lighter carbons, rods, and tubes consist of comminuted carbon particles bound together by an agent usually of a carbonaceous nature. For example, electrodes may be made of mixtures of carbon blacks and coke which are blended with a plastic carbonaceous material such as pitch. The green shapes formed from the solid particles and the plastic material are hardened suitably by baking to cause coking of the plastic binder. To join one carbon article in the conventional manner, a cement, usually a mixture of a pitch and a plasticizing organic compound, is placed between the two articles and hardened as by heating the cement to drive off or polymerize the plasticizer. In contrast to the conventional method for joining carbon articles, metals, such as steel, may be welded by melting portions of the articles to be joined, blending the molten portions and solidifying them to give a monolithic structure.

It is the object of the present invention to provide a method for joining carbon articles which eliminates the necessity for the use of conventional cements. Another object of the invention is to provide a method wherein carbon deposited in the joint hardens to form a strong, electrically conductive bond. Still another object of the invention is to provide a method for joining carbon articles wherein carbon is deposited in a molten state between two carbon articles and solidified to provide a bond between the articles. A further object of the invention is to provide a monolithic carbon body made by joining two or more carbon articles together by the process of the invention.

When carbon is heated at atmospheric pressure under conditions which prevent the oxidation or ignition of the carbon the carbon will not melt. Instead when the temperature is raised sufficiently the carbon will sublime. If the carbon is heated under pressure it can be liquefied at temperatures between its triple point and its critical point which lie, respectively, at approximately 100 atmospheres' pressure and 4000° Kelvin and 11500 atmospheres' pressure and 7000° Kelvin. The objects of the present invention are accomplished by subjecting carbon bodies to conditions of pressure and temperature conducive to the formation of carbon in a liquid state; forming a bridge of liquid carbon between the articles to be joined; and solidifying the liquid carbon while maintaining it in contact with the articles to be joined. The carbon solidified from the molten state according to the techniques of the invention has a graphitic structure and possesses strength approximately the same or often higher than that of the carbon articles which are joined together.

According to the preferred practice of the invention the carbon blocks to be joined are placed in contact with each other. The areas of the articles to be joined are placed in an atmosphere inert to the carbon articles. An electric current is passed from one article to another and the articles are spaced apart to provide an arc. The temperatures of the areas of the articles to be joined are raised by the passage of the current between them, and the ambient pressure is raised until the temperature and pressure lie between the triple point and critical point of carbon. Under these conditions portions of the articles melt and bridge the gap between them. The molten carbon has a resistivity so high that the electrical properties of the arc are not substantially affected by the bridging action. When a sufficient quantity of molten carbon is present between the articles the heat in the arc is reduced conveniently by bringing the solid portions of the carbon articles into contact with each other. The cooling causes the solidification of the molten material and a strong joint between the articles is effected. Carbonaceous material in rod or powder form can be supplied to the zone of the joint to minimize distortion of the articles or to provide additional strength to the joint if desired.

In the drawing an apparatus is portrayed diagrammatically which has been used in joining carbon articles according to the method of the invention.

In the apparatus represented in the drawing a pressure vessel 11 of stainless steel is provided with a cover 12. An inlet 13 in the cover permits the introduction of an inert gas into the vessel 11. Arranged within the vessel 11 as shown in the drawing are a carbon base block 21, a carbon crucible 22, and a carbon liner 23. The crucible 22 is in electrical contact with the pressure vessel 11 through the base block 21 and liner 23. Above the crucible 22, graphite radiation shields 24 and spacers 25 are arranged to impede the loss of heat from the crucible. An insulating plate 26 combines with a workpiece A to provide a closure for the crucible 22. A screw feed 27 and electrical lead 28 pass through the cover 12 of the pressure vessel and the lead is electrically insulated from it. Terminal 31 is attached to the cover 12.

The method of the invention can be illustrated in connection with a description of the operation of the apparatus in the drawing. Carbon workpieces A and B are placed in the apparatus as shown in the drawing. The cover 12 is fitted in place, and after the removal of air, an inert gas, suitably argon, under pressure is pumped into the vessel. The gas inlet 13 is sealed. An arc is struck between the carbon workpieces A and B, B being in electrical contact with the crucible 22. The length of the arc is regulated by means of the screw feed 27. When the pressure and temperature within the vessel 11 exceeds the triple point for carbon, melting of the workpieces occurs in the vicinity of the arc. Workpiece A is then moved towards workpiece B into the body of molten material. The current is cut off and the molten material solidifies joining the workpieces.

Specific examples of joints made in the illustrated apparatus are as follows:

Example 1

A rod ½ inch in diameter of artificial graphite was inserted in the apparatus in the position of rod A, and a block was placed in the position of block B. The block was molded from a mixture of 80% artificial graphite and 20% gas black and was bonded with carbonized coal tar pitch. At an argon pressure of 160 atmospheres, and with a direct current applied voltage of 95 volts (rod A positive), and with a current density which was computed to be approximately 475 amperes per square inch, the heating was maintained for approximately one half-minute. The resulting joint between rod A and block B was of such strength that in an attempt to break it the rod was broken and the joint remained intact.

Example II

A coke base carbon rod ½ inch in diameter was placed in position A and a carbon block 2 inches square by 1 inch thick was placed in position B. At an argon pressure of 160 atmospheres a direct current of 95 volts (rod A negative) was passed between the pieces for 7 minutes at an average current density of 370 amperes per square inch. The resulting joint had a resistance less than that of the rod and passed current thereafter at the same current density with less voltage drop than an equivalent thickness of the carbon rod.

Example III

An artificial graphite rod 5/16 inch in diameter was placed in position A and a graphite carbon block, as described in Example I, was placed in position B. With a pressure of 160 atmospheres' argon a current of 95 volts (rod A negative) was passed between the pieces. The current density was computed to be 650 amperes per square inch during the holding period of 4¾ minutes. A sample of the frozen graphite in the joint was found to have an apparent density higher than that of artificial graphite.

Example IV

A successful large area joint between a rod A 1½ inches in diameter and a graphite carbon black was made in approximately ½ minute. The artificial graphite rod was maintained at a positive 65 volts and at a current density of 160 amperes per square inch in an argon pressure of 185 atmospheres. The resulting joint was particularly uniform in appearance and mechanically strong.

With conditions of temperature and pressure such that the triple point is not exceeded, there will of course be no melting of the carbon. Nevertheless a joint of considerable strength can be made using the apparatus and techniques described above. In this instance the carbon forming the joint is obtained by the condensation of carbon from the gas phase. For example a graphite rod ½ inch in diameter and a block of graphite-carbon were placed in the apparatus as described in claim 1. An argon pressure of 63 atmospheres was maintained around the workpieces. A current of 87 volts at a current density of 385 amperes per square inch was passed through the work pieces with the rod forming the positive terminal. The rod and block were joined although the joint lacked some of the strength and conductivity of those obtained when molten carbon is present in the joint. Joints have been obtained in the manner described with pressure as low as 55 atmospheres.

The shape of the articles to be joined is not critical. Electrodes, blocks, tubes, rods and pipes are examples of the articles that may be treated according to the method of the invention. As can be seen from the examples the composition of the carbon articles to be joined need not be the same. The material in the joint formed by the solidification of the molten carbon had in general a graphitic structure and a resistivity less than that of artificial graphite. The mechanical strength of the joints of the invention was usually at least equal to and in many instances exceeded the strength of the workpieces.

Besides argon the other rare gases, for example helium, neon and krypton can be used in the method of the invention. It is necessary only that the gas used be incapable of reacting with the carbon at the temperatures and pressures involved in the method to an extent that would prohibit the formation of a liquid or gaseous carbon. Direct current and alternating current are suitable for use in the method. The polarity of the direct current is not critical although a quieter, more stable arc has been obtained when the upper workpiece or electrode (for example rod A in the drawing) is positive. Heating may be done of course by radiation or radio frequency induction, for example, without departing from the scope of the invention.

The method of the invention is useful in fabricating articles which are otherwise troublesome and tedious to make. For example, graphite connector rods may be attached to graphite anodes for use as thyratrons and ignitrons and carbon rods can be joined to carbon sheets according to the teachings of the invention.

In the appended claims the term "carbon" refers to all mechanically stable forms of carbon other than diamond.

What is claimed is:

1. A method of joining carbon articles, said method comprising juxtaposing the articles to be joined, establishing an electrical arc between said articles, maintaining a pressure of inert gas around the zone of the arc, increasing the temperature and pressure within the zone of the arc to a point above the triple point and below the critical point of carbon, said pressure not exceeding 11,500 atmospheres, melting carbon in the zone of the arc, bridging the space between the articles with molten carbon and solidifying said molten carbon thereby joining said articles.

2. A method as claimed in claim 1 wherein said temperature is between about 4,000° Kelvin and about 7,000° Kelvin and said pressure is between about 100 atmospheres and about 11,500 atmospheres.

3. A method as claimed in claim 2 wherein at least a portion of said molten carbon is provided from a source other than said articles to be joined.

4. A method as claimed in claim 2 wherein said molten carbon is solidified by reducing the current in said arc.

References Cited in the file of this patent

UNITED STATES PATENTS

| | | |
|---|---|---|
| 1,121,792 | Brown | Dec. 22, 1914 |
| 2,090,693 | Melton | Aug. 24, 1937 |
| 2,488,624 | Greaves et al. | Nov. 22, 1949 |
| 2,697,126 | Herres | Dec. 14, 1954 |

OTHER REFERENCES

Mellor: Comprehensive Treatise on Inorganic and Theoretical Chemistry, 1924, Longmans, Green & Co.; London; vol. 5, page 731.

Man Made Diamonds G.E.—Published By Research Info. Service; March 1955; The Knolls, Schenectady, N.Y.; page 12, paragraph 3.